(12) United States Patent  (10) Patent No.: US 7,873,961 B2
Miller et al.  (45) Date of Patent: Jan. 18, 2011

(54) SUPERVISORY OPERATING SYSTEM FOR RUNNING MULTIPLE CHILD OPERATING SYSTEMS SIMULTANEOUSLY AND OPTIMIZING RESOURCE USAGE

(75) Inventors: Laura F Miller, Essex Junction, VT (US); Nancy H. Pratt, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1565 days.

(21) Appl. No.: 11/161,330

(22) Filed: Jul. 29, 2005

(65) Prior Publication Data

US 2007/0028151 A1 Feb. 1, 2007

(51) Int. Cl.
*G06F 9/46* (2006.01)
*G06F 15/00* (2006.01)
*G06F 12/00* (2006.01)

(52) U.S. Cl. ............ 718/100; 718/107; 718/108; 712/208; 712/228; 711/173; 711/207; 711/208

(58) Field of Classification Search .......... 718/1, 718/100, 107, 108
See application file for complete search history.

(56) References Cited

U.S. PATENT DOCUMENTS

| | | | |
|---|---|---|---|
| 4,835,677 A | 5/1989 | Sato et al. | |
| 5,357,617 A | 10/1994 | Davis et al. | |
| 5,867,725 A | 2/1999 | Fung et al. | |
| 5,928,356 A * | 7/1999 | Golliver et al. | 712/228 |
| 6,405,234 B2 | 6/2002 | Ventrone | |
| 6,670,895 B2 * | 12/2003 | Singh | 341/50 |
| 6,678,712 B1 * | 1/2004 | McLaren et al. | 718/100 |
| 6,993,640 B2 * | 1/2006 | Doing et al. | 712/200 |
| 7,346,757 B2 * | 3/2008 | Hass et al. | 711/207 |
| 7,398,371 B2 * | 7/2008 | Plondke et al. | 711/207 |
| 2002/0016892 A1 * | 2/2002 | Zalewski et al. | 711/153 |
| 2003/0009648 A1 | 1/2003 | Doing et al. | |
| 2003/0041090 A1 | 2/2003 | Armstrong et al. | |
| 2003/0208664 A1 * | 11/2003 | Singh | 711/165 |
| 2004/0049672 A1 * | 3/2004 | Nollet et al. | 713/100 |
| 2004/0073766 A1 * | 4/2004 | Arimilli et al. | 711/202 |
| 2004/0098473 A1 | 5/2004 | Yodaiken | |
| 2005/0268137 A1 * | 12/2005 | Pettey | 713/400 |

* cited by examiner

*Primary Examiner*—Lewis A Bullock, Jr.
*Assistant Examiner*—Jennifer N To
(74) *Attorney, Agent, or Firm*—Schmeiser, Olsen & Watts; Michael J. LeStrange

(57) ABSTRACT

A method and system for supporting simultaneous operation of operating systems on a single integrated circuit. The system includes a supervisory operating system (SOS) managing execution of instructions, each instruction being executable under one of the operating systems; registers grouped into multiple sets of registers, each set maintaining an identity of one of the operating systems; and a dispatcher capable of dispatching an instruction and a tag attached to the instruction, the tag identifying one of the operating systems and the instruction to be executed under the identified operating system to access one of the registers. One or more of the registers are utilized when the instruction is executed, and are included in a single set of the multiple sets of registers. The single set maintains the identity of the operating system identified by the tag, and each of the one or more registers includes an identifier matching the tag.

20 Claims, 8 Drawing Sheets

SUPERVISORY OPERATING SYSTEM FOR RUNNING MULTIPLE CHILD OPERATING SYSTEMS SIMULTANEOUSLY AND OPTIMIZING RESOURCE USAGE

BACKGROUND OF THE INVENTION

1. Technical Field

The present invention relates to operating systems, and more particularly to a technique for running a plurality of operating systems simultaneously.

2. Related Art

Multiple resident operating systems are desirable because particular operating systems are either well suited or required for loading and operating certain applications. Further, an additional resident operating system may be necessary when an update of a processor and operating system results in an older version of an application no longer being compatible with the updated system. A conventional computing system allows for switching between multiple resident operating systems, but is not optimized for multiple operating systems operating simultaneously. When multiple operating systems are run concurrently with known techniques analogous to multitasking, contention for register access occurs. To address register access contention, conventional techniques swap register content out to memory when a new operating system desires control. Frequent swapping of register contents results in slower performance of the computing system. Further, known emulation techniques for running multiple operating systems also results in slower performance. Thus, there is a need for an improved technique for running multiple operating systems concurrently.

SUMMARY OF THE INVENTION

The present invention provides a system for supporting simultaneous operation of a plurality of operating systems on a single integrated circuit, the system comprising:

a supervisory operating system (SOS) managing execution of a plurality of instructions, each instruction of the plurality of instructions executable under an operating system of the plurality of operating systems operating simultaneously;

a plurality of registers grouped into multiple sets of registers, said multiple sets having a one-to-one correspondence with said plurality of operating systems, and each set maintaining an identity and a functionality of a corresponding operating system of said plurality of operating systems; and a dispatcher capable of dispatching an instruction and an identifying tag attached to the instruction to be executed to access a register of the plurality of registers, the identifying tag identifying an operating system of the plurality of operating systems, wherein the instruction is to be executed under the operating system, wherein one or more registers utilized when the instruction is executed are included in a single set of the multiple sets of registers, the single set maintaining the identity of the operating system, and each of the one or more registers maintaining an identifier matching the identifying tag.

In second embodiments, the present invention provides a method of simultaneously operating a plurality of operating systems on a single integrated circuit, the method comprising:

managing, via a supervisory operating system (SOS), execution of a plurality of instructions, each instruction of the plurality of instructions executable under an operating system of the plurality of operating systems operating simultaneously;

providing a plurality of registers grouped into multiple sets of registers, the multiple sets having a one-to-one correspondence with the plurality of operating systems, and each set maintaining an identity and a functionality of a corresponding operating system of the plurality of operating systems; and dispatching, via a dispatcher, an instruction and an identifying tag attached to the instruction to be executed to access a register of the plurality of registers, the identifying tag identifying an operating system of the plurality of operating systems, wherein the instruction is to be executed under the operating system, wherein one or more registers utilized when the instruction is executed are included in a single set of the multiple sets of registers, the single set maintaining the identity of the operating system, and each of the one or more registers maintaining an identifier matching the identifying tag.

In third embodiments, the present invention provides at least one program storage device readable by a machine, tangibly embodying at least one program of instructions executable by the machine to perform a method of simultaneously operating a plurality of operating systems on a single integrated circuit, the method comprising: managing via a supervisory operating system (SOS), execution of a plurality of instructions, each instruction of the plurality of instructions executable under an operating system of the plurality of operating systems operating simultaneously;

providing a plurality of registers grouped into multiple sets of registers, the multiple sets having a one-to-one correspondence with the plurality of operating systems, and each set maintaining an identity and a functionality of a corresponding operating system of the plurality of operating systems; and dispatching, via a dispatcher, an instruction and an identifying tag attached to the instruction to be executed to access a register of the plurality of registers, the identifying tag identifying an operating system of the plurality of operating systems, wherein the instruction is to be executed under the operating system, wherein one or more registers utilized when the instruction is executed are included in a single set of the multiple sets of registers, the single set maintaining the identity of the operating system, and each of the one or more registers maintaining an identifier matching the identifying tag.

Advantageously, the present invention provides simultaneous and independent operation of multiple operating systems while avoiding register access contention and without the conventional overhead of task switching or emulation. Further, the present invention provides a mechanism for monitoring and swapping register contents among hardwired, cache memory mapped and external memory mapped registers to optimize resource usage. Still further, the present invention allows a user to maintain an investment in a broad range of software that requires various operating systems, rather than incur costs related to new software development.

DETAILED DESCRIPTION OF THE INVENTION

The present invention provides a method and system for operating, in real time, multiple operating systems simultaneously by utilizing multiple sets of registers. Each operating system is running in parallel without the knowledge of the other operating systems. A tagging mechanism associates each set of registers with one of the operating systems, and these associations are tracked by a supervisory operating system which directs resource requests to the appropriate registers. The supervisory operating system also monitors and optimizes resource usage.

Figure 1:
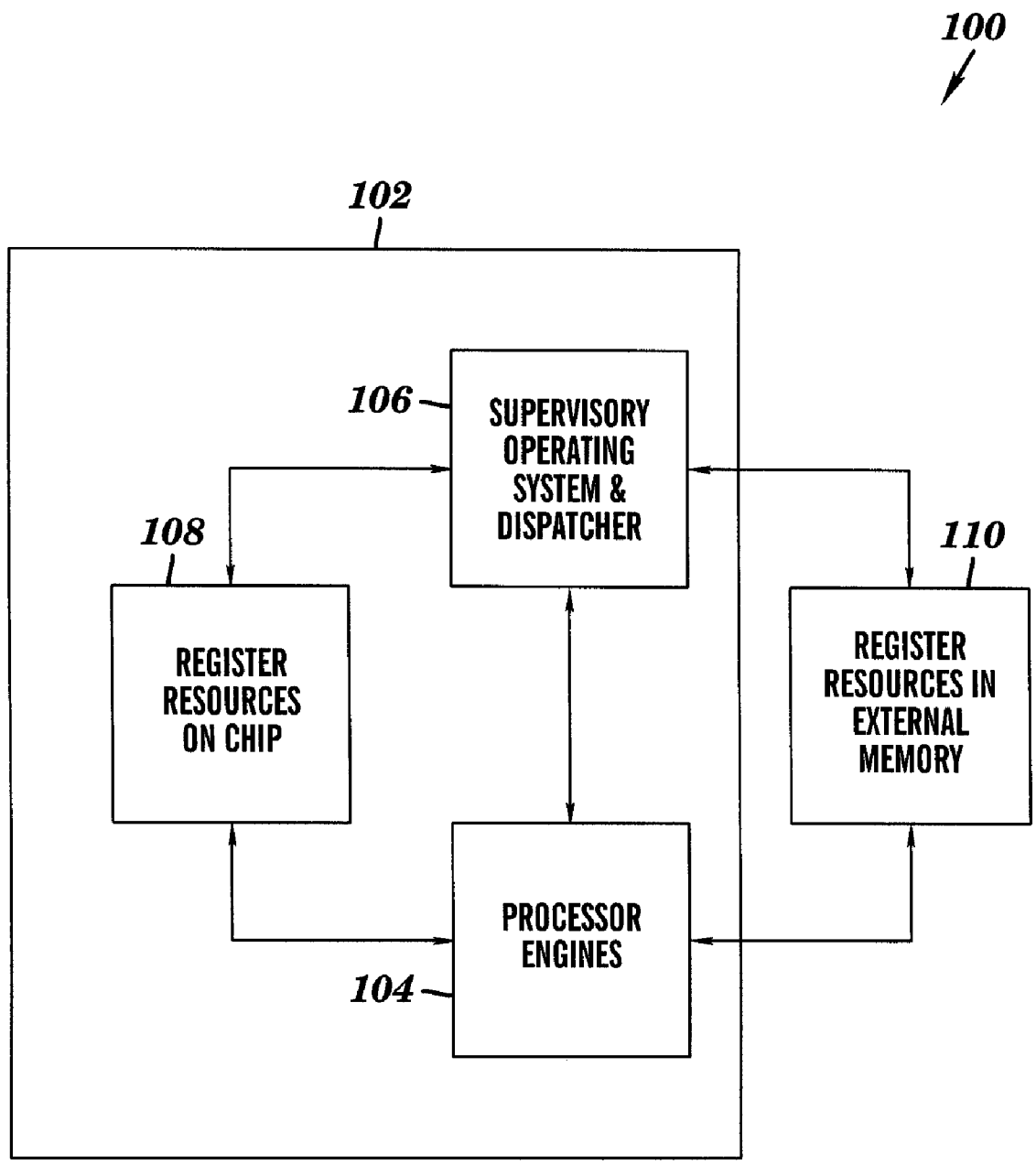
FIG. 1 is a block diagram of a computing system, in accordance with embodiments of the present invention.

FIG. 1 is a block diagram of a computing system, in accordance with embodiments of the present invention. A computing system 100 includes a system on a chip (i.e., single chip microprocessor, and hereinafter, simply "chip") 102. Chip 102 includes processor engines 104 (e.g., execution units), a supervisory operating system (SOS) and instruction dispatcher 106, and register resources 108. Other register resources 110 reside in memory external to chip 102. The register resources 108, 110 include available storage areas for data utilized for program flow management, address generation and storage of contents of an instruction stream. Register resources 108 residing on chip 102 include sets of registers hardwired on chip 102 and also sets of registers stored on a cache residing on chip 102. The former sets of hardwired registers are referred to herein as "directly mapped registers", and the latter are referred to as "cache memory mapped registers." Directly mapped registers are dedicated resources of chip 102, and therefore require no address look-up when being accessed (i.e., look-up latency is avoided). In contrast, cache memory mapped registers reside in a cache storage area where their access requires a look-up using stored addresses or tags. Register resources 110 residing in external memory are referred to herein as "external memory mapped registers." Examples of commonly used registers that can make up a set to be stored in resources 108, 110 and which are accessed by operating systems and applications (not shown) in system 100 include, but are not limited to: General Purpose Registers, Instruction Data Registers (IDR), Address Registers, the Main Control Register (MCR), and the Program Status Register (PSR).

Figure 2:
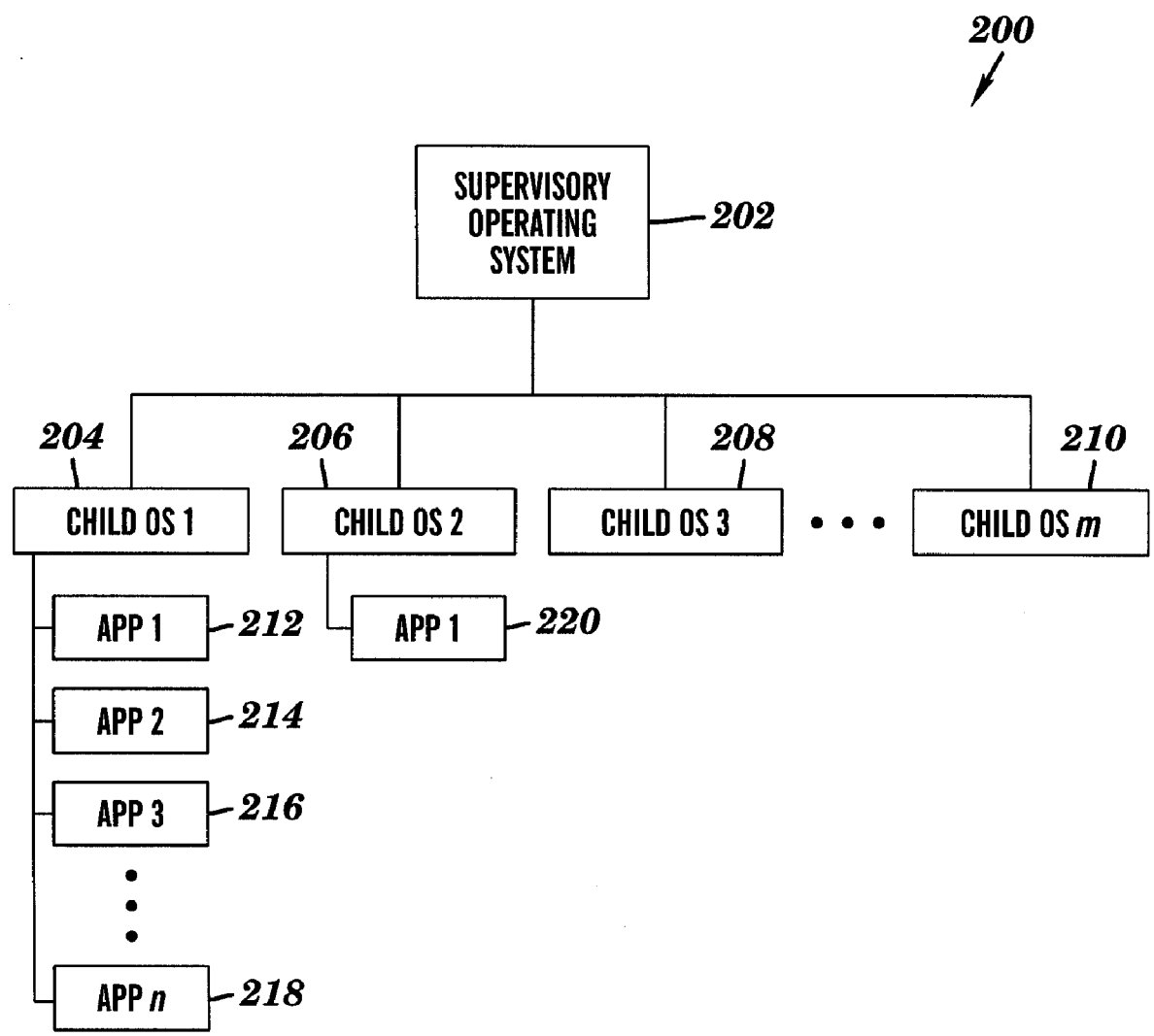
FIG. 2 is a hierarchy of operating systems and applications included in the computing system of FIG. 1, in accordance with embodiments of the present invention.

FIG. 2 is a hierarchy of operating systems and applications included in the computing system of FIG. 1, in accordance with embodiments of the present invention. In hierarchy 200, a supervisory operating system (SOS) 202 is a parent in the hierarchy to a plurality of child operating systems (e.g., child operating systems 204, 206, 208, 210). Herein, a child operating system is referred to as a child OS or a COS. One or more applications are executed under each of one or more of the COSs. For example, a plurality of applications (e.g., applications 212, 214, 216, 218) are executed under COS 204 and one application 220 is executed under COS 206. Each COS is, for example, a vendor version of an operating system that is capable of operating on system 100 (see FIG. 1). Each COS runs as it was designed, and has no knowledge of any other COS, nor of SOS 202. The multiple COSs can include any combination of N copies of similar child operating systems and M copies of different child operating systems.

SOS 202 is a global operating system resident on chip 102 (see FIG. 1), which runs while computing system 100 (see FIG. 1) is operating, and is interrupt or timer-driven. SOS 202 is a unit to be added to a system on a chip, and can be externally loaded or permanently programmed on chip 102 (see FIG. 1). The functions of SOS 202 include efficiently managing the concurrent and independent execution of multiple COSs within the integrated design of chip 102 (see FIG. 1). SOS 202 intercepts instructions from applications running under a COS and directs a tag to be added to the instruction to indicate the COS running the application associated with the instruction.

SOS 202 is assigned the highest privilege level of the architecture underlying computing system 100 (see FIG. 1). That is, SOS 202 has the most privileges, and is capable of running instructions that are the most restricted. For example, SOS 202 is the only operating system (OS) capable of running a set of restricted instructions for assigning privilege levels to COSs. An attempt by any other operating system or application to execute these restricted instructions causes a processor exception. In contrast to the conventional approach of assigning the highest privilege level to an OS and the lowest privilege level to applications being executed under the OS, the present invention utilizes three intermediate levels (e.g., levels 1, 2 and 3) between the highest level (e.g., level 0) assigned to the SOS and the lowest level (e.g., level 4) assigned to applications. These intermediate levels are assigned to COSs to distinguish between three possible locations of the set of registers associated with each COS. A level of a particular COS is determined by the assignment of resources to one of those three locations (i.e., directly mapped registers (e.g., level 1), cache memory mapped registers (e.g., level 2), and external memory mapped registers (e.g., level 3)). For example, a COS whose resources are assigned to a directly mapped register set is assigned the next highest level below the level of the SOS. Once a COS is assigned a level, the SOS remains at the highest level and the individual COS tasks still operate at the lowest level. The three locations for storing sets of registers are described in detail below relative to FIG. 5.

Figure 3:
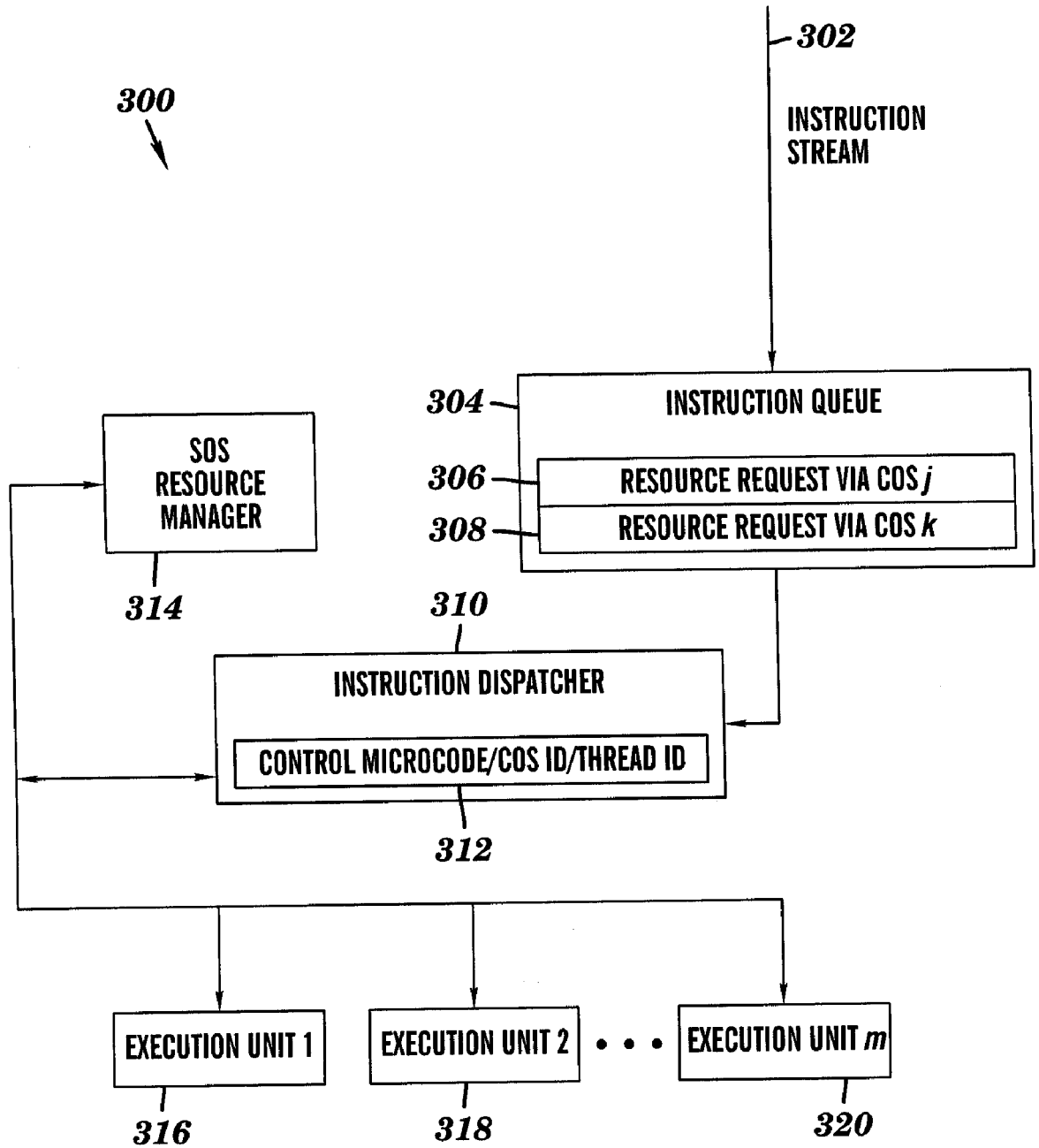
FIG. 3 depicts a flow of data in a resource management system implemented in the computing system of FIG. 1, in accordance with embodiments of the present invention.

FIG. 3 depicts a flow of data in a resource management system implemented in the computing system of FIG. 1, in accordance with embodiments of the present invention. Resource management system 300 operates in system 100 (see FIG. 1) and includes an instruction stream 302, which is input into an instruction queue 304. Instruction queue 304 includes, for example, one or more instructions requesting usage of resources. A resource is a set of directly mapped registers, or a space in a cache or external memory for storage of a set of registers that is allocated to a COS or is available and can be allocated to a COS. To use allocated resources, these instructions require access to registers that may be directly mapped registers, cache memory mapped registers or external memory mapped registers. Each resource request instruction is executed under one of the child operating systems 204-210 of FIG. 2. As one example, instruction queue 304 includes instructions 306, 308, which request resources via COS j and COS k, respectively.

Instructions 306, 308 are input into instruction dispatcher 310, which is included in the SOS & dispatcher 106 of FIG. 1. Dispatcher 310 decodes the instruction input to the dispatcher to generate control microcode. The output of dispatcher 310 is the decoded instruction, along with an instruction thread identifier and a COS identifier tag 312. The COS tag keeps track of which operating system is managing execution of the instruction input into dispatcher 310. In one embodiment, dispatcher 310 adds a COS identifying tag to an instruction (e.g., instruction 306) to identify the COS under which the instruction is executed. The tag is, for example, an n-bit field (e.g., 4 bits to support up to 16 COSs). In another embodiment, multiple instructions executing under multiple COSs can each be tagged in the aforementioned manner, thereby allowing the multiple instructions to each be executed under its respective COS, while the COSs run simultaneously.

Further, the contents of each register in system 100 (see FIG. 1) includes the COS ID tag described above to indicate which COS is associated with the contents of the register. For instance, the content of a control register includes its typical data bits, as well as an additional n-bit COS ID tag field. Instructions that require access to registers are directed to their respective sets of registers by matching the COS ID tag of an instruction to the COS ID tag of the contents of a set of registers. This tagging mechanism allows operations associated with one COS to work in parallel with operations associated with another COS.

In an alternate embodiment, instead of the tagging mechanism, one or more lookup tables are maintained to track the associations between operating systems and sets of registers, and between instructions and operating systems. SOS 202 (see FIG. 2) includes an SOS resource manager 314 that employs the COS ID tag of an instruction 306 or 308 to manage a particular execution unit of a plurality of execution units 316, 318, 320 that can access an appropriate resource (e.g., set of registers) (not shown). Determining the appropriate resource to access is also facilitated by the SOS resource manager 314 utilizing an indicator of the storage location of the resource.

For example, an instruction is fetched and dispatcher 310 obtains the COS ID tag of the instruction. Using the COS ID tag, SOS resource manager 314 determines the location of a resource allocated to a set of registers by means of a lookup table that matches the COS ID tag to a privilege level number assigned to the COS. The privilege level number also indicates the storage location of the set of registers associated with the COS. When the privilege level number is used herein to reference a set of registers, the number is also known as a "register level." For instance, a register level of 1 indicates that a set of registers associated with the COS is a set of directly mapped registers. Further, a register level of 2 refers to a set of cache memory mapped registers, and a register level of 3 refers to a set of external memory mapped registers.

If the register level is 1, SOS 314 provides dispatcher 310 with the specific set of directly mapped registers that is associated with the COS ID tag. In one embodiment, the SOS utilizes a lookup table to determine the specific set of registers from among multiple sets of directly mapped registers.

If the register level is 2, the SOS uses the COS ID tag of the instruction as a lookup for the set of registers residing in a cache. The cache and its access via a COS ID tag are described in detail below relative to FIG. 4.

If the register level is 3, a supervisory operating system call is issued which directs the SOS to use the COS ID tag of the instruction to fetch the appropriate set of registers from external memory. In one embodiment, the SOS utilizes another lookup table to determine the external memory location associated with the COS identified by the COS ID tag.

In addition to using the COS ID tag to determine the set of registers associated with an instruction, the SOS also sends one or more multiplexer control signals so that data from the set of registers requested by the instruction can be accessed via an execution unit. The SOS's control of multiplexers is described below relative to FIG. 5.

Figure 4:
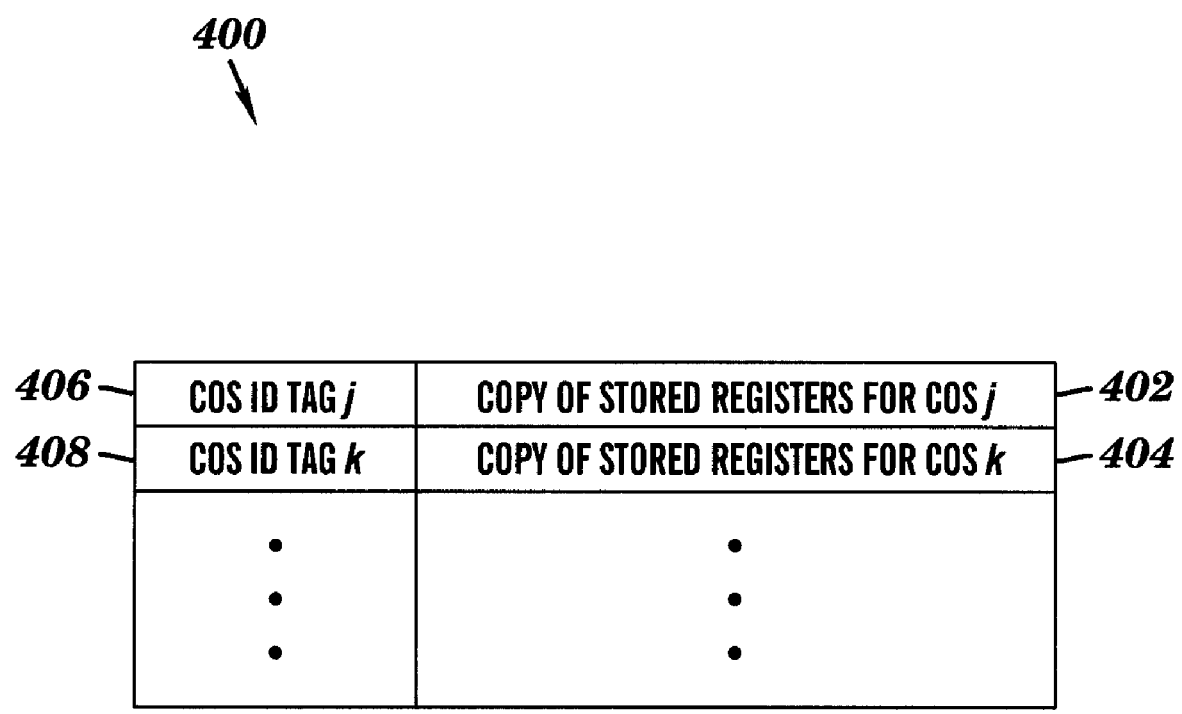
FIG. 4 depicts a child operating system cache utilized in the computing system of FIG. 1, in accordance with embodiments of the present invention.

FIG. 4 depicts a child operating system cache (COS cache) utilized in the computing system of FIG. 1, in accordance with embodiments of the present invention. COS cache 400 includes sets of stored registers 402, 404 (i.e., cache memory mapped registers), each of which maintains an identity and a functionality of a specific COS of the plurality of COSs shown in FIG. 2. As used herein, a set of registers is defined to be all the registers required for the operation of instruction control, data fetching/storing, the mathematical or bit checking function, and any other instruction based function. Each set of registers in COS cache 400 includes copies of the types of registers included in each set of directly mapped registers on chip 102 (see FIG. 1), in a one-to-one correspondence. COS cache 400 also includes COS tags 406, 408, which identify the COS associated with register sets 402, 404, respectively. The COS tags 406, 408 are used as lookups when their associated register sets are being accessed via an instruction that includes a COS tag.

When the number of multiple COSs is great enough so that their respective associated sets of registers outnumber the resources available as directly mapped registers, COS cache 400 provides additional locations for the overflow sets of registers. For example, if 9 COSs are running simultaneously and 9 sets of registers are required, but chip 102 is limited to 5 sets of registers in its directly mapped registers, then an additional 4 sets of registers are stored in COS cache 400. The 5 sets of directly mapped registers plus the 4 sets of cache memory mapped registers provide the required total of 9 sets of registers. Further, if the overflow sets of registers outnumber the available space in the COS cache, then the remaining overflow sets are stored in external memory.

When an instruction requesting access to registers stored in COS cache 400 is dispatched by dispatcher 310 (see FIG. 3) and managed by SOS resource manager 314 (see FIG. 3), the COS ID tag included in the instruction is compared to all the tags of COS cache 400 associatively (i.e., the COS cache is fully associative), and if one of the tags in COS cache 400 matches the COS ID tag of the instruction, then the set of registers associated with the matching tag of COS cache 400 is accessed.

Figure 5:
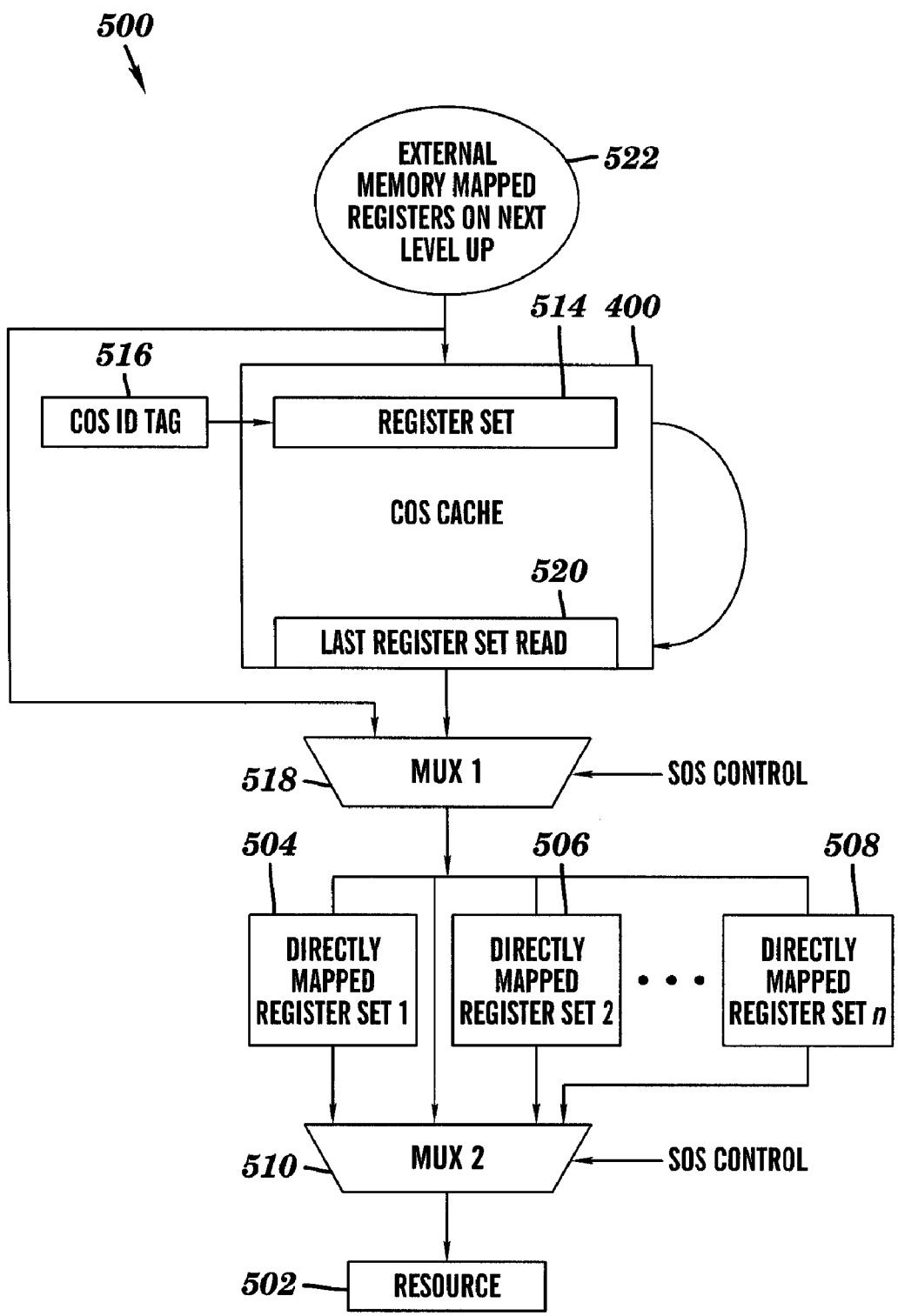
FIG. 5 depicts a register resource selection system implemented in the system of FIG. 1 and utilizing the cache of FIG. 4, in accordance with embodiments of the present invention.

FIG. 5 depicts a register resource selection system implemented in the system of FIG. 1 and utilizing the cache of FIG. 4, in accordance with embodiments of the present invention. In resource selection system 500, a resource 502 is provided the contents of registers of a set of registers associated with a COS. For example, register contents from one of a plurality of directly mapped register sets 504, 506, 508 is provided to resource 502 via multiplexer 510 utilizing control signal input from SOS 202 (see FIG. 2).

Register contents can also be accessed from COS cache 400, which includes a set of registers 514 whose registers correspond in a one-to-one manner with registers in each of the directly mapped register sets 504, 506, 508. To access register set 514 in COS cache 400, an instruction includes COS ID tag 516 which identifies the COS that is associated with both the instruction and the register set 514. The register contents from register set 514 are provided to resource 502 via multiplexer 518 and multiplexer 510 (i.e., the contents are multiplexed around the directly mapped register sets), where each multiplexer utilizes control signal input from the SOS. In one embodiment, after register set 514 is accessed, the set is indicated as the last register set read 520, so that the set can be more quickly accessed in a subsequent lookup. The multiplexing described relative to the COS cache allows the present invention to run, in real time, directly off of a cached version of a register set associated with a COS.

Although not shown in detail in FIG. 5, register contents can also be accessed from external memory mapped registers at a level 522 shown above COS cache 400. The register contents from a set of registers residing in external memory are provided to resource 502 via multiplexers 510, 518, thereby multiplexing around COS cache 400 and around the directly mapped register sets 504, 506, 508. This multiplexing allows the present invention to run, in real time, off of an external memory mapped register set. The preferred embodiment, however, avoids the slow performance associated with running directly off external memory mapped registers, and upon processing an instruction requiring a level 3 register set (i.e., external memory mapped register set), the level 3 register set is swapped with a level 2 (i.e., cache memory mapped register set) or a level 1 register set (i.e., directly mapped register set) to obtain the faster performance provided by the cache memory mapped or the directly mapped registers. In one embodiment, the swapping between a level 3 and a level 2 or level 1 is not allowed unless the SOS considers the potential privilege level of the COS currently at level 3 to be equal to or greater than the other COSs currently associated with level 2 and level 1.

FIG. 5 also shows a hierarchical relationship among (1) directly mapped registers, (2) cache memory mapped registers, and (3) external memory mapped registers, which affects the performance of system 100 (see FIG. 1). The fastest system performance is provided when directly mapped registers are being accessed, and the slowest performance is provided when external memory mapped registers are accessed.

As will be apparent to one skilled in the art, resources in addition to resource 502 can be added to FIG. 5. For example, if N additional resources are added to the system of FIG. 5, then the same type of multiplexer configuration shown in FIG. 5 is repeated N additional times. That is, N pairs of multiplexers in the same configuration as multiplexers 510, 512 are added to correspond in a one-to-one manner with the N additional resources. Thus, any one of the N additional resources is capable of receiving register contents from external memory or from COS cache 400 by utilizing the resource's associated multiplexers included in the N pairs of additional multiplexers.

Figure 6:
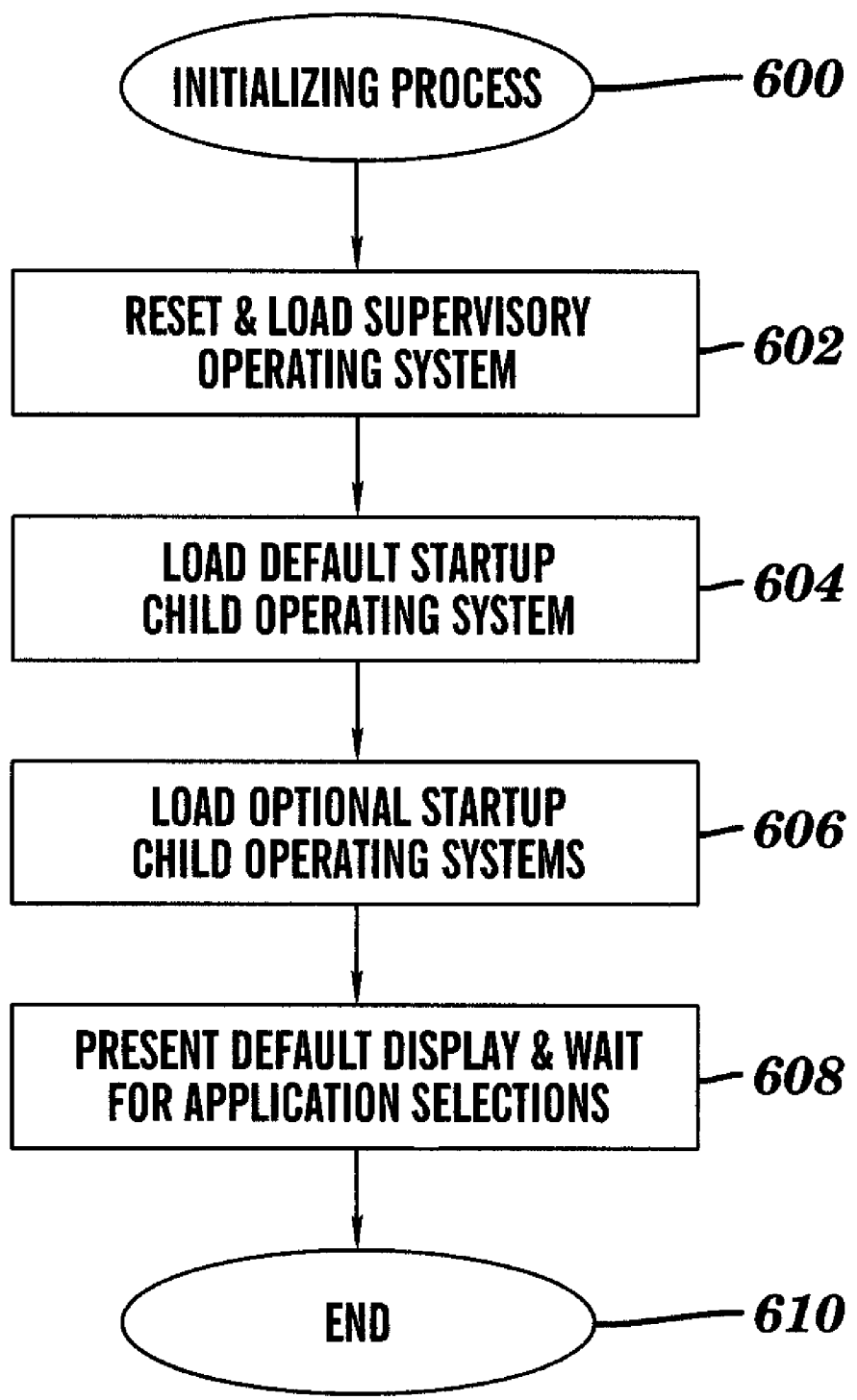
FIG. 6 is a flow chart showing a process for initializing the system of FIG. 1, in accordance with embodiments of the present invention.

FIG. 6 is a flow chart showing a process for initializing the system of FIG. 1, in accordance with embodiments of the present invention. The system initialization process begins at step 600. System 100 (see FIG. 1) is reset and SOS 202 (see FIG. 2; see also SOS/dispatcher 106 in FIG. 1) is loaded in step 602. System resources are initialized and self-checks are performed. In step 604, the SOS loads a default startup COS and the default startup COS's set of directly mapped registers. The default startup COS is, for instance, the operating system (e.g., Windows NT) originally shipped with computing system 100 (see FIG. 1). In one embodiment, the default startup COS is the operating system that is always launched upon starting up computing system 100 (see FIG. 1). In step 606, a set of one or more COSs are optionally loaded as startup operating systems, which are available to a user of system 100 (see FIG. 1) at startup. For each of the optional startup COSs being loaded, step 606 includes: (1) assigning a COS ID tag to the startup COS; (2) determining a register level for the register set associated with the startup COS; (3) loading the contents of the registers in the associated register set; and (4) running the startup COS. The register level of the register set determines how the register set is to be stored: directly mapped, cache memory mapped, or external memory mapped. After the startup COSs are loaded, step 608 presents a default display to a user of system 100 (see FIG. 1) and the user selects one or more applications to be executed. After the application(s) are selected, the initialization process ends at step 610, and the running/optimization process begins as described below relative to FIG. 7.

Figure 7:
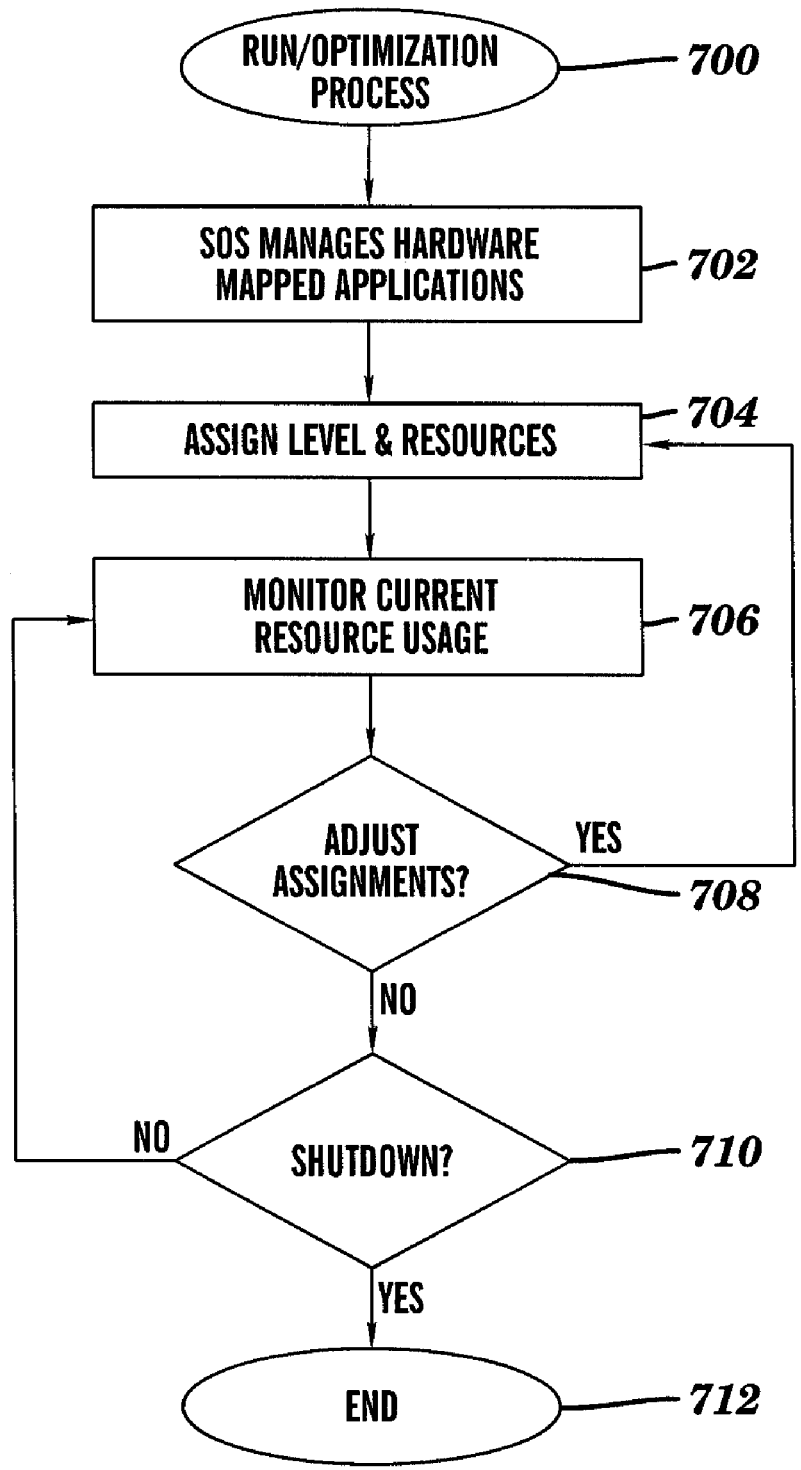
FIG. 7 is a flow chart showing a process for running applications executed under the operating systems of FIG. 2, and for optimizing the usage of the registers of FIG. 5, in accordance with embodiments of the present invention.

FIG. 7 is a flow chart showing a run/optimization process for running applications executed under the operating systems of FIG. 2, and for optimizing the usage of the registers of FIG. 5, in accordance with embodiments of the present invention. The run/optimization process starts at step 700, and in step 702, the SOS manages instructions of hardware mapped applications. The user selects additional COSs to be loaded in step 704. For each additional COS selected, step 704 includes: (1) assigning a COS ID tag to the COS; (2) determining a register level for the register set associated with the COS; (3) loading the contents of the registers in the associated register set; and (4) running the COS. In step 706, register resource usage is monitored by the SOS via tracking the usage of directly mapped registers 504, 506, 508 (see FIG. 5), COS cache 400 (see FIG. 5), and external memory mapped registers 522 (see FIG. 5). Timeouts and exits are also monitored in step 706 to determine resource usage. The information collected in step 706 can be used to determine and/or adjust a priority queue. The priority queue can be re-examined on a continuous basis, or with each newly loaded COS.

In inquiry step 708, the SOS determines if assignments of register levels in step 704 need to be adjusted. For example, COS i is associated with a set of registers that are directly mapped and COS j is associated with a set of registers that reside in COS cache 400 (see FIG. 5). If usage statistics collected in step 706 determine that usage of COS j exceeds predetermined criteria and usage of COS i is below predetermined criteria and is the lowest usage of the COSs associated with directly mapped registers, then step 708 determines that COS i registers and COS j registers are to be swapped, so that the more heavily used COS j registers become directly mapped and the rarely used registers of COS i become cache memory mapped. This swap will improve system efficiency because directly mapped registers are accessed more quickly than the other types of registers.

Once step 708 determines that a swap is to be performed, the process loops back to step 704 where a level remap function is triggered so that the register level associated with COS i is re-assigned (e.g., from a level 1 to a level 2 to indicate the change from directly mapped registers to cache memory mapped registers), and the register level of COS j is re-assigned (e.g., from a level 2 to a level 1 to indicate the change from cache memory mapped registers to directly mapped registers). Further, the loop back to step 704 performs the swap so that the contents of the COS i registers reside in the COS cache and the contents of the COS j registers are directly mapped.

A step 708 adjustment based on a newly loaded COS includes, for example, moving a COS associated with directly mapped registers back a level to the COS cache, so that a newly loaded COS can reside at the directly mapped register level. The existing displaced COS remains operable after its resources are moved into the COS cache.

If inquiry step 708 determines that no adjustments are necessary, inquiry step 710 determines whether or not a processor shutdown is being performed. If step 710 determines that there is no shutdown, the process loops to step 706, and current resource usage continues to be monitored as described above. If there is a processor shutdown determined by step 710, then all open COS shutdowns continue in the same manner as an individually running operating system, and the run/optimization process ends at step 712.

A shutdown process for an open COS can include a retirement of a single COS. Retirement includes, for instance, closing a window on a screen display in which a COS is running, freeing up resources, moving another COS set of register contents to a different level to occupy the freed up resources, updating the register level of the moved register contents, and writing back to external memory content related to the COS being retired. Determining the specific COS register set to move down a level (e.g., from cache memory mapped to directly mapped) is based on, for example, statistics related to the usage of the COS register sets in the COS cache.

In another embodiment, a retirement of a COS places the COS in a freeze (a.k.a. sleep) mode. Placing a COS in freeze mode includes freezing the COS by stopping the program counter from incrementing. If there are no register sets at a higher level that can be moved down to switch with the register set of the COS being frozen, then the COS register sets remains in its current location. For example, if only two COSs (COS 1 and COS 2) have registers directly mapped, but there is room for four sets of directly mapped registers and no other set exists to change to a level 1, then the COS register set being frozen remains at its level 1 location. On the other hand, if there is another set that can use the level 1 resources, then the COS register set being frozen is popped up to the COS cache. In this case, if there are sufficient non-frozen COS register sets to also fill the COS cache, then the register set being frozen is moved instead to external memory.

A power management shutdown occurs when chip 102 (see FIG. 1) powers off. This shutdown process includes the retirement steps described above, and also includes saving out to external memory the contents of all of the directly mapped registers to facilitate returning upon powering up.

Figure 8:
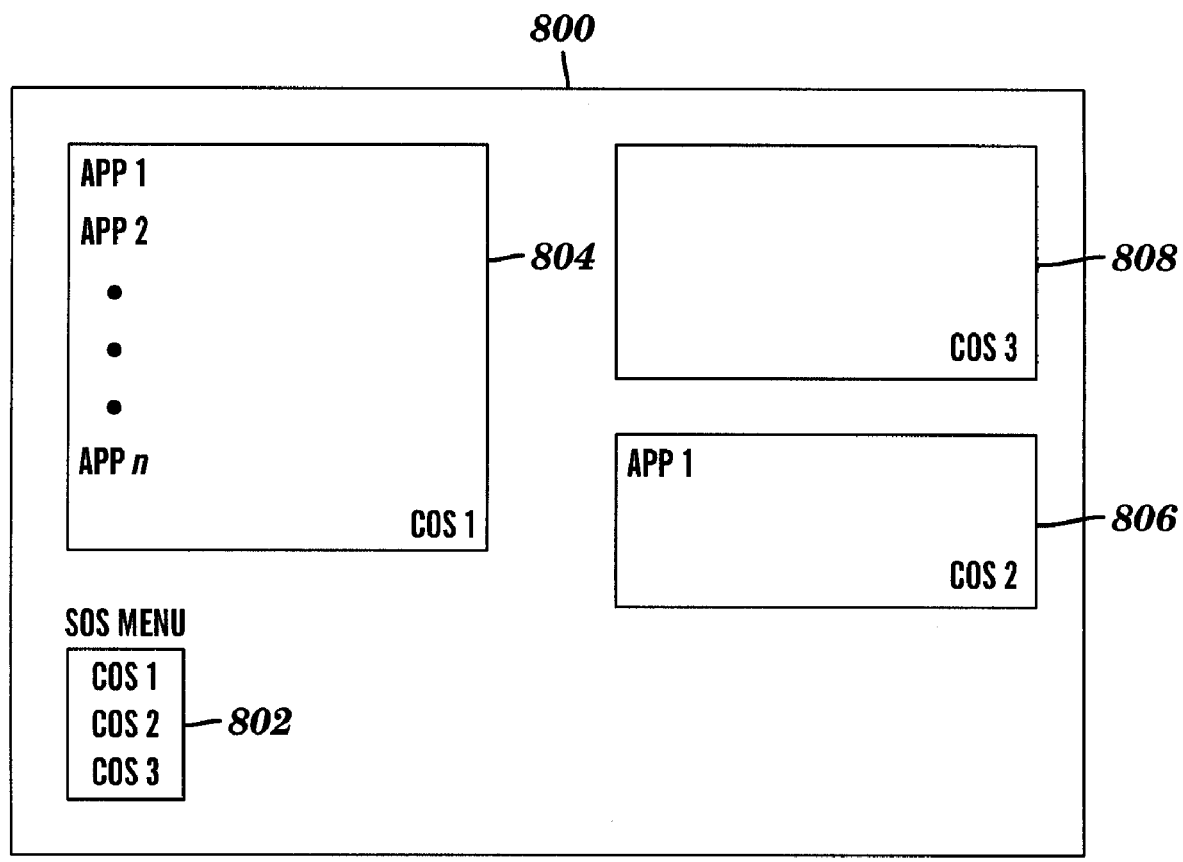
FIG. 8 depicts a screen display showing applications executed under multiple operating systems running simultaneously via the process of FIG. 7, in accordance with embodiments of the present invention.

FIG. 8 depicts a screen display showing applications executed under multiple operating systems running simultaneously via the process of FIG. 7, in accordance with embodiments of the present invention. Screen display 800 is an example of a GUI interface presented by computing system 100 (see FIG. 1). Screen display 800 includes an SOS menu 802 from which multiple COSs can be selected by a user of the computing system to run simultaneously. Once a COS is selected, the SOS launches the COS and a window appears within screen display 800 that displays applications running under the selected COS. For example, window 804 displays COS 1, which is running applications 1, 2, . . . n; window 806 displays COS 2, which is running application 1; and window 808 displays COS 3, which has no currently running applications. The user then selects one or more applications to run within a COS.

The SOS allocates window space to each COS selected by the user via SOS menu 802. Each COS performs its functions as if its allocated window is the non-shared window. The mapping program is scaled by the SOS so that each COS does not have any knowledge of a shared window space.

Further, an application and its copy can be running under two different COS windows simultaneously. For example, in FIG. 8, application APP 1 is running under COS 1 in window 804 at the same time a copy of APP 1 is running under COS 2 in window 806. In this example, APP 1 and its copy are installed separately within COS 1 and COS 2, respectively.

All of the COSs reside on a storage device, such as a hard drive. The present invention does not partition the hard drive storing the COSs. When loading a new COS to the hard drive, the user will have options such as replacing the default startup COS with the new COS; including the new COS as one of the startup COSs; and selecting the privilege level of the new COS. Instead of the user selecting the privilege level of the new COS, the best available privilege level can be automatically assigned to the new COS. The SOS maintains current knowledge of the stored COSs that can be selected from the hard drive, including newly loaded ones.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of simultaneously operating multiple operating systems on a single integrated circuit, comprising:

a computer system loading a supervisory operating system (SOS) on said single integrated circuit included in said computer system prior to a loading of any other operating system on said single integrated circuit, wherein said SOS manages simultaneous and independent executions of said multiple operating systems without employing task switching or emulation, and wherein said multiple operating systems includes first, second and third operating systems;

said computer system providing first, second and third sets of registers in one-to-one correspondence with said first, second and third operating systems, respectively, wherein said first set of registers consists of directly mapped registers that are hardwired on and are dedicated resources of said single integrated circuit and whose access does not require an address lookup, wherein second set of registers resides in a cache storage area on said single integrated circuit and whose access requires a lookup using an identifier or an address, wherein said third set of registers resides in an external memory that is included in said computer system but is external to said single integrated circuit;

said SOS assigning first, second and third tags to identify said first, second and third operating systems, respectively, wherein said first tag includes a first value indicating that said first set of registers corresponding to said first operating system consists of said directly mapped registers, wherein said second tag includes a second value indicating that said second set of registers corresponding to said second operating system resides in said cache storage area, and wherein said third tag includes a third value indicating that said third set of registers corresponding to said third operating system resides in said external memory;

said SOS loading said first tag and first contents consisting of first data bits into said first set of registers that consist of said directly mapped registers, loading said second tag and second contents consisting of second data bits into said second set of registers residing in said cache storage area, and loading said third tag and third contents consisting of third data bits into said third set of registers residing in said external memory;

said SOS intercepting first, second and third instructions being executed under said first, second and third operating systems, respectively, wherein said first, second and third instructions require access of said first, second and third contents, respectively;

said SOS adding first, second and third identifiers respectively to said intercepted first, second and third instructions, respectively based on said first operating system being identified by said assigned first tag and executing said first instruction, said second operating system being identified by said assigned second tag and executing said second instruction, and said third operating system being identified by said assigned third tag and executing said third instruction; and said SOS initiating simultaneous access of said first, second and third contents in said first, second and third sets of registers, respectively, by said SOS dispatching and tracking said first, second and third instructions respectively to said directly mapped registers, said cache storage area, and said external memory, and respectively based on said SOS identifying first, second and third matches, wherein said first match is between said first identifier added to said first instruction and said first tag loaded into said first set of registers, wherein said second match is between said second identifier added to said second instruction and said second tag loaded into said second set of registers, and wherein said third match is between said third identifier added to said third instruction and said third tag loaded into said third set of registers.

2. The method of claim 1, further comprising:

subsequent to said loading said first tag and said first contents, said second tag and said second contents, and said third tag and said third contents, said SOS determining a first statistic indicating a first usage of said first set of registers and a second statistic indicating a second usage of said second set of registers;

said SOS comparing said first and second statistics with predetermined criteria, wherein a result of said comparing is a determination that contents of a set of registers are required to be swapped with said second contents in said second set of registers to improve efficiency of said computer system;

said SOS determining said first usage is less than usage determined for any other set of registers that consist of other directly mapped registers on said single integrated circuit;

based on said comparing said first and second statistics and said determining said first usage of said first set of registers is less than said usage determined for any other set of registers that consist of other directly mapped registers, said SOS swapping said first and second contents so that said first contents are removed from said first set of registers and loaded into said second set of registers in said cache storage area, said second set of registers correspond to said first operating system, said second contents are removed from said second set of registers and loaded into said first set of registers that are directly mapped registers, said first set of registers correspond to said second operating system, and said efficiency of said computer system is improved;

responsive to said comparing said first and second statistics and said determining said first usage of said first set of registers is less than said usage determined for any other set of registers that consist of other directly mapped registers, said SOS changing said first tag identifying said first operating system to include said second value instead of said first value, said second value included in said first tag indicating said second set of registers corresponding to said first operating system is included in said cache storage area; and responsive to said comparing said first and second statistics and said determining said first usage of said first set of registers is less than said usage determined for any other set of registers that consist of other directly mapped registers, said SOS changing said second tag identifying said second operating system to include said first value instead of said second value, said first value included in said second tag indicating said first set of registers corresponding to said second operating system consists of said directly mapped registers.

3. The method of claim 1, further comprising:

said computer system providing a fourth set of registers residing in said cache storage area;

said computer system receiving a selection to load a fourth operating system included in said multiple operating systems;

subsequent to said receiving said selection to load said fourth operating system, said SOS moving said first contents from said first set of registers to said fourth set of registers so that said fourth set of registers correspond to said first operating system, and subsequently loading fourth contents into said first set of registers so that said first set of registers correspond to said fourth operating system, said fourth contents to be accessed by instructions running under said fourth operating system;

subsequent to said receiving said selection to load said fourth operating system, said SOS assigning a fourth tag to identify said fourth operating system, wherein said fourth tag includes said first value indicating that said first set of registers corresponding to said fourth operating system consists of said directly mapped registers; and said SOS changing said first tag identifying said first operating system to include said second value instead of said first value, said second value included in said first tag indicating said fourth set of registers corresponding to said first operating system resides in said cache storage area.

4. The method of claim 1, further comprising:

said computer system providing a fourth set of registers initially corresponding to a fourth operating system of said multiple operating systems, wherein said fourth set of registers resides in said external memory;

said SOS assigning a fourth tag to identify said fourth operating system, wherein said fourth tag includes said third value indicating that said fourth set of registers initially corresponding to said fourth operating system resides in said external memory;

said SOS loading said fourth tag and fourth contents consisting of fourth data bits into said fourth set of registers residing in said external memory;

subsequent to said SOS initiating simultaneous access of said first, second and third contents, said SOS intercepting a fourth instruction being executed under said fourth operating system, wherein said fourth instruction requires access of said fourth contents;

subsequent to said intercepting said fourth instruction, said SOS swapping said first and fourth contents so that said first contents are removed from said first set of registers and loaded into said fourth set of registers in said external memory, said fourth set of registers correspond to said first operating system, said fourth contents are removed from said fourth set of registers and loaded into said first set of registers that are directly mapped registers, and said first set of registers correspond to said fourth operating system, wherein a result of said swapping is a faster processing of said fourth instruction by an access of said fourth contents from said directly mapped registers instead of from said external memory;

subsequent to said SOS intercepting said fourth instruction, said SOS changing said first tag identifying said first operating system to include said third value instead of said first value, said third value included in said first tag indicating said fourth set of registers corresponding to said first operating system is included in said external memory; and subsequent to said SOS intercepting said fourth instruction, said SOS changing said fourth tag identifying said fourth operating system to include said first value instead of said third value, said first value included in said fourth tag indicating said first set of registers corresponding to said fourth operating system consists of said directly mapped registers.

5. The method of claim 1, further comprising:

said computer system providing a fourth set of registers initially corresponding to a fourth operating system of said multiple operating systems, wherein said fourth set of registers resides in said external memory;

said SOS assigning a fourth tag to identify said fourth operating system, wherein said fourth tag includes said third value indicating that said fourth set of registers initially corresponding to said fourth operating system resides in said external memory;

said SOS loading said fourth tag and fourth contents consisting of fourth data bits into said fourth set of registers residing in said external memory;

subsequent to said SOS initiating simultaneous access of said first, second and third contents, said SOS intercepting a fourth instruction being executed under said fourth operating system, wherein said fourth instruction requires access of said fourth contents;

subsequent to said intercepting said fourth instruction, said SOS swapping said second and fourth contents so that said second contents are removed from said second set of registers and loaded into said fourth set of registers in said external memory, said fourth set of registers correspond to said second operating system, said fourth contents are removed from said fourth set of registers and loaded into said second set of registers residing in said cache storage area, and said second set of registers correspond to said fourth operating system, wherein a result of said swapping is a faster processing of said fourth instruction by an access of said fourth contents from said cache storage area instead of from said external memory;

subsequent to said SOS intercepting said fourth instruction, said SOS changing said second tag identifying said second operating system to include said third value instead of said second value, said third value included in said second tag indicating said fourth set of registers corresponding to said second operating system is included in said external memory; and subsequent to said SOS intercepting said fourth instruction, said SOS changing said fourth tag identifying said fourth operating system to include said second value instead of said third value, said second value included in said fourth tag indicating said second set of registers corresponding to said fourth operating system resides in said cache storage area.

6. The method of claim 1, further comprising:

inserting said first, second and third values to said first, second and third tags, respectively;

prior to said adding said first, second and third identifiers, inserting said first, second and third values to said first, second and third identifiers, respectively, so that said first, second and third instructions include said first, second and third values, respectively, wherein said dispatching and tracking said first, second and third instructions respectively to said directly mapped registers, said cache storage area, and said external memory includes:

determining said first value included in said first instruction indicates said directly mapped registers;

determining said second value included in said second instruction indicates said cache storage area; and determining said third value included in said third instruction indicates said external memory.

7. The method of claim 1, further comprising:

subsequent to said SOS initiating simultaneous access of said first, second and third contents, said computer system initiating a shutdown of said first operating system;

responsive to said initiating said shutdown of said first operating system, said computer system freeing said first set of registers;

subsequent to said freeing said first set of registers, determining said second content is to be moved from second set of registers to said first set of registers based on usage of said second content included in said second set of registers;

responsive to said determining said second content is to be moved, said SOS moving said second contents from said second set of registers to said first set of registers so that said first set of registers correspond to said second operating system; and said SOS changing said second tag identifying said second operating system to include said first value instead of said second value, said first value included in said second tag indicating said first set of registers corresponding to said second operating system consists of said directly mapped registers.

8. A computer system comprising:

a processor; and computer usable media coupled to said processor and containing instructions that when carried out by said processor implement a method of simultaneously operating multiple operating systems on a single integrated circuit, said method comprising:

loading a supervisory operating system (SOS) on said single integrated circuit included in said computer system prior to a loading of any other operating system on said single integrated circuit, wherein said SOS manages simultaneous and independent executions of said multiple operating systems without employing task switching or emulation, and wherein said multiple operating systems includes first, second and third operating systems;

providing first, second and third sets of registers in one-to-one correspondence with said first, second and third operating systems, respectively, wherein said first set of registers consists of directly mapped registers that are hardwired on and are dedicated resources of said single integrated circuit and whose access does not require an address lookup, wherein second set of registers resides in a cache storage area on said single integrated circuit and whose access requires a lookup using an identifier or an address, wherein said third set of registers resides in an external memory that is included in said computer system but is external to said single integrated circuit;

said SOS assigning first, second and third tags to identify said first, second and third operating systems, respectively, wherein said first tag includes a first value indicating that said first set of registers corresponding to said first operating system consists of said directly mapped registers, wherein said second tag includes a second value indicating that said second set of registers corresponding to said second operating system resides in said cache storage area, and wherein said third tag includes a third value indicating that said third set of registers corresponding to said third operating system resides in said external memory;

said SOS loading said first tag and first contents consisting of first data bits into said first set of registers that consist of said directly mapped registers, loading said second tag and second contents consisting of second data bits into said second set of registers residing in said cache storage area, and loading said third tag and third contents consisting of third data bits into said third set of registers residing in said external memory;

said SOS intercepting first, second and third instructions being executed under said first, second and third operating systems, respectively, wherein said first, second and third instructions require access of said first, second and third contents, respectively;

said SOS adding first, second and third identifiers respectively to said intercepted first, second and third instructions, respectively based on said first operating system being identified by said assigned first tag and executing said first instruction, said second operating system being identified by said assigned second tag and executing said second instruction, and said third operating system being identified by said assigned third tag and executing said third instruction; and said SOS initiating simultaneous access of said first, second and third contents in said first, second and third sets of registers, respectively, by said SOS dispatching and tracking said first, second and third instructions respectively to said directly mapped registers, said cache storage area, and said external memory, and respectively based on said SOS identifying first, second and third matches, wherein said first match is between said first identifier added to said first instruction and said first tag loaded into said first set of registers, wherein said second match is between said second identifier added to said second instruction and said second tag loaded into said second set of registers, and wherein said third match is between said third identifier added to said third instruction and said third tag loaded into said third set of registers.

9. The computer system of claim 8, wherein said method further comprises:

subsequent to said loading said first tag and said first contents, said second tag and said second contents, and said third tag and said third contents, said SOS determining a first statistic indicating a first usage of said first set of registers and a second statistic indicating a second usage of said second set of registers;

said SOS comparing said first and second statistics with predetermined criteria, wherein a result of said comparing is a determination that contents of a set of registers are required to be swapped with said second contents in said second set of registers to improve efficiency of said computer system;

said SOS determining said first usage is less than usage determined for any other set of registers that consist of other directly mapped registers on said single integrated circuit;

based on said comparing said first and second statistics and said determining said first usage of said first set of registers is less than said usage determined for any other set of registers that consist of other directly mapped registers, said SOS swapping said first and second contents so that said first contents are removed from said first set of registers and loaded into said second set of registers in said cache storage area, said second set of registers correspond to said first operating system, said second contents are removed from said second set of registers and loaded into said first set of registers that are directly mapped registers, said first set of registers correspond to said second operating system, and said efficiency of said computer system is improved;

responsive to said comparing said first and second statistics and said determining said first usage of said first set of registers is less than said usage determined for any other set of registers that consist of other directly mapped registers, said SOS changing said first tag identifying said first operating system to include said second value instead of said first value, said second value included in said first tag indicating said second set of registers corresponding to said first operating system is included in said cache storage area; and responsive to said comparing said first and second statistics and said determining said first usage of said first set of registers is less than said usage determined for any other set of registers that consist of other directly mapped registers, said SOS changing said second tag identifying said second operating system to include said first value instead of said second value, said first value included in said second tag indicating said first set of registers corresponding to said second operating system consists of said directly mapped registers.

10. The computer system of claim 8, wherein said method further comprises:

providing a fourth set of registers residing in said cache storage area;

receiving a selection to load a fourth operating system included in said multiple operating systems;

subsequent to said receiving said selection to load said fourth operating system, said SOS moving said first contents from said first set of registers to said fourth set of registers so that said fourth set of registers correspond to said first operating system, and subsequently loading fourth contents into said first set of registers so that said first set of registers correspond to said fourth operating system, said fourth contents to be accessed by instructions running under said fourth operating system;

subsequent to said receiving said selection to load said fourth operating system, said SOS assigning a fourth tag to identify said fourth operating system, wherein said fourth tag includes said first value indicating that said first set of registers corresponding to said fourth operating system consists of said directly mapped registers; and said SOS changing said first tag identifying said first operating system to include said second value instead of said first value, said second value included in said first tag indicating said fourth set of registers corresponding to said first operating system resides in said cache storage area.

11. The computer system of claim 8, wherein said method further comprises:

said computer system providing a fourth set of registers initially corresponding to a fourth operating system of said multiple operating systems, wherein said fourth set of registers resides in said external memory;

said SOS assigning a fourth tag to identify said fourth operating system, wherein said fourth tag includes said third value indicating that said fourth set of registers initially corresponding to said fourth operating system resides in said external memory;

said SOS loading said fourth tag and fourth contents consisting of fourth data bits into said fourth set of registers residing in said external memory;

subsequent to said SOS initiating simultaneous access of said first, second and third contents, said SOS intercepting a fourth instruction being executed under said fourth operating system, wherein said fourth instruction requires access of said fourth contents;

subsequent to said intercepting said fourth instruction, said SOS swapping said first and fourth contents so that said first contents are removed from said first set of registers and loaded into said fourth set of registers in said external memory, said fourth set of registers correspond to said first operating system, said fourth contents are removed from said fourth set of registers and loaded into said first set of registers that are directly mapped registers, and said first set of registers correspond to said fourth operating system, wherein a result of said swapping is a faster processing of said fourth instruction by an access of said fourth contents from said directly mapped registers instead of from said external memory;

subsequent to said SOS intercepting said fourth instruction, said SOS changing said first tag identifying said first operating system to include said third value instead of said first value, said third value included in said first tag indicating said fourth set of registers corresponding to said first operating system is included in said external memory; and subsequent to said SOS intercepting said fourth instruction, said SOS changing said fourth tag identifying said fourth operating system to include said first value instead of said third value, said first value included in said fourth tag indicating said first set of registers corresponding to said fourth operating system consists of said directly mapped registers.

12. The computer system of claim 8, wherein said method further comprises:

said computer system providing a fourth set of registers initially corresponding to a fourth operating system of said multiple operating systems, wherein said fourth set of registers resides in said external memory;

said SOS assigning a fourth tag to identify said fourth operating system, wherein said fourth tag includes said third value indicating that said fourth set of registers initially corresponding to said fourth operating system resides in said external memory;

said SOS loading said fourth tag and fourth contents consisting of fourth data bits into said fourth set of registers residing in said external memory;

subsequent to said SOS initiating simultaneous access of said first, second and third contents, said SOS intercepting a fourth instruction being executed under said fourth operating system, wherein said fourth instruction requires access of said fourth contents;

subsequent to said intercepting said fourth instruction, said SOS swapping said second and fourth contents so that said second contents are removed from said second set of registers and loaded into said fourth set of registers in said external memory, said fourth set of registers correspond to said second operating system, said fourth contents are removed from said fourth set of registers and loaded into said second set of registers residing in said cache storage area, and said second set of registers correspond to said fourth operating system, wherein a result of said swapping is a faster processing of said fourth instruction by an access of said fourth contents from said cache storage area instead of from said external memory;

subsequent to said SOS intercepting said fourth instruction, said SOS changing said second tag identifying said second operating system to include said third value instead of said second value, said third value included in said second tag indicating said fourth set of registers corresponding to said second operating system is included in said external memory; and subsequent to said SOS intercepting said fourth instruction, said SOS changing said fourth tag identifying said fourth operating system to include said second value instead of said third value, said second value included in said fourth tag indicating said second set of registers corresponding to said fourth operating system resides in said cache storage area.

13. The computer system of claim 8, wherein said method further comprises:

inserting said first, second and third values to said first, second and third tags, respectively;

prior to said adding said first, second and third identifiers, inserting said first, second and third values to said first, second and third identifiers, respectively, so that said first, second and third instructions include said first, second and third values, respectively, wherein said dispatching and tracking said first, second and third instructions respectively to said directly mapped registers, said cache storage area, and said external memory includes:

determining said first value included in said first instruction indicates said directly mapped registers;

determining said second value included in said second instruction indicates said cache storage area; and determining said third value included in said third instruction indicates said external memory.

14. The computer system of claim 8, wherein said method further comprises:

subsequent to said SOS initiating simultaneous access of said first, second and third contents, said computer system initiating a shutdown of said first operating system;

responsive to said initiating said shutdown of said first operating system, said computer system freeing said first set of registers;

subsequent to said freeing said first set of registers, determining said second content is to be moved from second set of registers to said first set of registers based on usage of said second content included in said second set of registers;

responsive to said determining said second content is to be moved, said SOS moving said second contents from said second set of registers to said first set of registers so that said first set of registers correspond to said second operating system; and said SOS changing said second tag identifying said second operating system to include said first value instead of said second value, said first value included in said second tag indicating said first set of registers corresponding to said second operating system consists of said directly mapped registers.

15. At least one program storage device readable by a machine, tangibly embodying at least one program of instructions executable by the machine to perform a method of simultaneously operating multiple operating systems on a single integrated circuit included in a computer system, said method comprising:

loading a supervisory operating system (SOS) on said single integrated circuit included in said computer system prior to a loading of any other operating system on said single integrated circuit, wherein said SOS manages simultaneous and independent executions of said multiple operating systems without employing task switching or emulation, and wherein said multiple operating systems includes first, second and third operating systems;

providing first, second and third sets of registers in one-to-one correspondence with said first, second and third operating systems, respectively, wherein said first set of registers consists of directly mapped registers that are hardwired on and are dedicated resources of said single integrated circuit and whose access does not require an address lookup, wherein second set of registers resides in a cache storage area on said single integrated circuit and whose access requires a lookup using an identifier or an address, wherein said third set of registers resides in an external memory that is included in said computer system but is external to said single integrated circuit;

said SOS assigning first, second and third tags to identify said first, second and third operating systems, respectively, wherein said first tag includes a first value indicating that said first set of registers corresponding to said first operating system consists of said directly mapped registers, wherein said second tag includes a second value indicating that said second set of registers corresponding to said second operating system resides in said cache storage area, and wherein said third tag includes a third value indicating that said third set of registers corresponding to said third operating system resides in said external memory;

said SOS loading said first tag and first contents consisting of first data bits into said first set of registers that consist of said directly mapped registers, loading said second tag and second contents consisting of second data bits into said second set of registers residing in said cache storage area, and loading said third tag and third contents consisting of third data bits into said third set of registers residing in said external memory;

said SOS intercepting first, second and third instructions being executed under said first, second and third operating systems, respectively, wherein said first, second and third instructions require access of said first, second and third contents, respectively;

said SOS adding first, second and third identifiers respectively to said intercepted first, second and third instructions, respectively based on said first operating system being identified by said assigned first tag and executing said first instruction, said second operating system being identified by said assigned second tag and executing said second instruction, and said third operating system being identified by said assigned third tag and executing said third instruction; and said SOS initiating simultaneous access of said first, second and third contents in said first, second and third sets of registers, respectively, by said SOS dispatching and tracking said first, second and third instructions respectively to said directly mapped registers, said cache storage area, and said external memory, and respectively based on said SOS identifying first, second and third matches, wherein said first match is between said first identifier added to said first instruction and said first tag loaded into said first set of registers, wherein said second match is between said second identifier added to said second instruction and said second tag loaded into said second set of registers, and wherein said third match is between said third identifier added to said third instruction and said third tag loaded into said third set of registers.

16. The at least one program storage device of claim 15, wherein said method further comprises:

subsequent to said loading said first tag and said first contents, said second tag and said second contents, and said third tag and said third contents, said SOS determining a first statistic indicating a first usage of said first set of registers and a second statistic indicating a second usage of said second set of registers;

said SOS comparing said first and second statistics with predetermined criteria, wherein a result of said comparing is a determination that contents of a set of registers are required to be swapped with said second contents in said second set of registers to improve efficiency of said computer system;

said SOS determining said first usage is less than usage determined for any other set of registers that consist of other directly mapped registers on said single integrated circuit;

based on said comparing said first and second statistics and said determining said first usage of said first set of registers is less than said usage determined for any other set of registers that consist of other directly mapped registers, said SOS swapping said first and second contents so that said first contents are removed from said first set of registers and loaded into said second set of registers in said cache storage area, said second set of registers correspond to said first operating system, said second contents are removed from said second set of registers and loaded into said first set of registers that are directly mapped registers, said first set of registers correspond to said second operating system, and said efficiency of said computer system is improved;

responsive to said comparing said first and second statistics and said determining said first usage of said first set of registers is less than said usage determined for any other set of registers that consist of other directly mapped registers, said SOS changing said first tag identifying said first operating system to include said second value instead of said first value, said second value included in said first tag indicating said second set of registers corresponding to said first operating system is included in said cache storage area; and responsive to said comparing said first and second statistics and said determining said first usage of said first set of registers is less than said usage determined for any other set of registers that consist of other directly mapped registers, said SOS changing said second tag identifying said second operating system to include said first value instead of said second value, said first value included in said second tag indicating said first set of registers corresponding to said second operating system consists of said directly mapped registers.

17. The at least one program storage device of claim 15, wherein said method further comprises:

providing a fourth set of registers residing in said cache storage area;

receiving a selection to load a fourth operating system included in said multiple operating systems;

subsequent to said receiving said selection to load said fourth operating system, said SOS moving said first contents from said first set of registers to said fourth set of registers so that said fourth set of registers correspond to said first operating system, and subsequently loading fourth contents into said first set of registers so that said first set of registers correspond to said fourth operating system, said fourth contents to be accessed by instructions running under said fourth operating system;

subsequent to said receiving said selection to load said fourth operating system, said SOS assigning a fourth tag to identify said fourth operating system, wherein said fourth tag includes said first value indicating that said first set of registers corresponding to said fourth operating system consists of said directly mapped registers; and said SOS changing said first tag identifying said first operating system to include said second value instead of said first value, said second value included in said first tag indicating said fourth set of registers corresponding to said first operating system resides in said cache storage area.

18. The at least one program storage device of claim 15, wherein said method further comprises:

said computer system providing a fourth set of registers initially corresponding to a fourth operating system of said multiple operating systems, wherein said fourth set of registers resides in said external memory;

said SOS assigning a fourth tag to identify said fourth operating system, wherein said fourth tag includes said third value indicating that said fourth set of registers initially corresponding to said fourth operating system resides in said external memory;

said SOS loading said fourth tag and fourth contents consisting of fourth data bits into said fourth set of registers residing in said external memory;

subsequent to said SOS initiating simultaneous access of said first, second and third contents, said SOS intercepting a fourth instruction being executed under said fourth operating system, wherein said fourth instruction requires access of said fourth contents;

subsequent to said intercepting said fourth instruction, said SOS swapping said first and fourth contents so that said first contents are removed from said first set of registers and loaded into said fourth set of registers in said external memory, said fourth set of registers correspond to said first operating system, said fourth contents are removed from said fourth set of registers and loaded into said first set of registers that are directly mapped registers, and said first set of registers correspond to said fourth operating system, wherein a result of said swapping is a faster processing of said fourth instruction by an access of said fourth contents from said directly mapped registers instead of from said external memory;

subsequent to said SOS intercepting said fourth instruction, said SOS changing said first tag identifying said first operating system to include said third value instead of said first value, said third value included in said first tag indicating said fourth set of registers corresponding to said first operating system is included in said external memory; and subsequent to said SOS intercepting said fourth instruction, said SOS changing said fourth tag identifying said fourth operating system to include said first value instead of said third value, said first value included in said fourth tag indicating said first set of registers corresponding to said fourth operating system consists of said directly mapped registers.

19. The at least one program storage device of claim 15, wherein said method further comprises:

said computer system providing a fourth set of registers initially corresponding to a fourth operating system of said multiple operating systems, wherein said fourth set of registers resides in said external memory;

said SOS assigning a fourth tag to identify said fourth operating system, wherein said fourth tag includes said third value indicating that said fourth set of registers initially corresponding to said fourth operating system resides in said external memory;

said SOS loading said fourth tag and fourth contents consisting of fourth data bits into said fourth set of registers residing in said external memory;

subsequent to said SOS initiating simultaneous access of said first, second and third contents, said SOS intercepting a fourth instruction being executed under said fourth operating system, wherein said fourth instruction requires access of said fourth contents;

subsequent to said intercepting said fourth instruction, said SOS swapping said second and fourth contents so that said second contents are removed from said second set of registers and loaded into said fourth set of registers in said external memory, said fourth set of registers correspond to said second operating system, said fourth contents are removed from said fourth set of registers and loaded into said second set of registers residing in said cache storage area, and said second set of registers correspond to said fourth operating system, wherein a result of said swapping is a faster processing of said fourth instruction by an access of said fourth contents from said cache storage area instead of from said external memory;

subsequent to said SOS intercepting said fourth instruction, said SOS changing said second tag identifying said second operating system to include said third value instead of said second value, said third value included in said second tag indicating said fourth set of registers corresponding to said second operating system is included in said external memory; and subsequent to said SOS intercepting said fourth instruction, said SOS changing said fourth tag identifying said fourth operating system to include said second value instead of said third value, said second value included in said fourth tag indicating said second set of registers corresponding to said fourth operating system resides in said cache storage area.

20. The at least one program storage device of claim 15, wherein said method further comprises:
   inserting said first, second and third values to said first, second and third tags, respectively;
   prior to said adding said first, second and third identifiers, inserting said first, second and third values to said first, second and third identifiers, respectively, so that said first, second and third instructions include said first, second and third values, respectively, wherein said dispatching and tracking said first, second and third instructions respectively to said directly mapped registers, said cache storage area, and said external memory includes:
   determining said first value included in said first instruction indicates said directly mapped registers;
   determining said second value included in said second instruction indicates said cache storage area; and
   determining said third value included in said third instruction indicates said external memory.

* * * * *